US 6,642,458 B2

(12) United States Patent
Panagrossi III et al.

(10) Patent No.: US 6,642,458 B2
(45) Date of Patent: Nov. 4, 2003

(54) TOUCH SCREEN DEVICE AND METHOD FOR CO-EXTENSIVELY PRESENTING TEXT CHARACTERS AND RENDERING INK IN A COMMON AREA OF A USER INTERFACE

(75) Inventors: Gerald Thomas Panagrossi III, Sunnyvale, CA (US); Steven Nowlan, San Jose, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/175,200

(22) Filed: Jun. 19, 2002

(65) Prior Publication Data

US 2002/0158923 A1 Oct. 31, 2002

Related U.S. Application Data

(63) Continuation of application No. 09/133,626, filed on Aug. 13, 1998, now abandoned.

(51) Int. Cl.$^7$ ............................................... G08C 21/00
(52) U.S. Cl. ............................... 178/18.01; 178/18.03; 178/18.05; 178/18.06; 178/19.01; 178/19.03; 178/19.04
(58) Field of Search .................................. 345/173, 174, 345/179, 592, 629, 634, 635, 636; 178/18.01, 18.03, 18.05, 18.06, 18.07, 19.01, 19.03, 19.04, 19.05

(56) References Cited

U.S. PATENT DOCUMENTS

| | | |
|---|---|---|
| 5,155,813 A | 10/1992 | Donoghue et al. |
| RE34,476 E | 12/1993 | Norwood |
| 5,357,062 A | 10/1994 | Rockwell et al. |
| 5,561,446 A | 10/1996 | Montlick |
| 5,581,052 A | 12/1996 | Padula et al. |
| 5,654,529 A | 8/1997 | Yeung et al. |
| 5,724,985 A | 3/1998 | Snell et al. |
| 5,841,978 A | 11/1998 | Rhoads |
| 5,953,735 A | 9/1999 | Forcier |
| 6,014,135 A | 1/2000 | Fernandes |

*Primary Examiner*—Vijay Shankar
(74) *Attorney, Agent, or Firm*—Hisashi D. Watanabe

(57) ABSTRACT

A touch screen device and method for co-extensively and contrastingly presenting text characters (34) and rendering ink (36) in a common area of a user interface. The text characters (34) and the rendering ink (36) are presented in relative contrast such that co-extensive text characters (34) and rendering ink (36) are independently legible.

15 Claims, 1 Drawing Sheet

TOUCH SCREEN DEVICE AND METHOD FOR CO-EXTENSIVELY PRESENTING TEXT CHARACTERS AND RENDERING INK IN A COMMON AREA OF A USER INTERFACE

RELATED APPLICATIONS

This is a continuation of U.S. application Ser. No. 09/133,626, filed Aug. 13, 1998, now abandoned.

FIELD OF THE INVENTION

The present invention relates to a touch screen device and method for co-extensively presenting text characters and rendering ink in a common area of a user interface.

BACKGROUND OF THE INVENTION

Many small electronic devices, such as personal digital assistants, smart phones, palm personal computers, etc., are now equipped with a touch-sensitive display screen as the primary mechanism for interacting with applications on the device and inputting information into the device. One form of input method which works well on a small device with a small screen is some form of handwriting input. In particular, many small devices currently use a graphical user interface (GUI) in which some region of the screen area (often one or more boxes) is dedicated as a writing area for handwriting input. Such use of the standard GUI can make very inefficient use of screen real estate, especially when it is necessary to display information (e.g., a message) to which the user wishes to respond and to display the user's response while still displaying the dedicated writing area.

Thus, a need exists for a method and apparatus that allows a maximum amount of information to be displayed on the GUI while still allowing handwritten input on the touch screen device.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

The preferred embodiment of the present invention describes a touch screen device (hereinafter referred to as the "device") which allows an entire graphical user interface (hereinafter referred to as "GUI") to be used to display textual characters, while at the same time allowing the entire GUI to serve as an input area for handwritten characters (hereinafter referred to as "rendering ink"). Thus, the device is used to display text characters, rendering ink and other GUI elements, such as buttons, icons, etc., co-extensively on the GUI, thus allowing a maximum amount of information to be displayed on the GUI.

Figure 1:
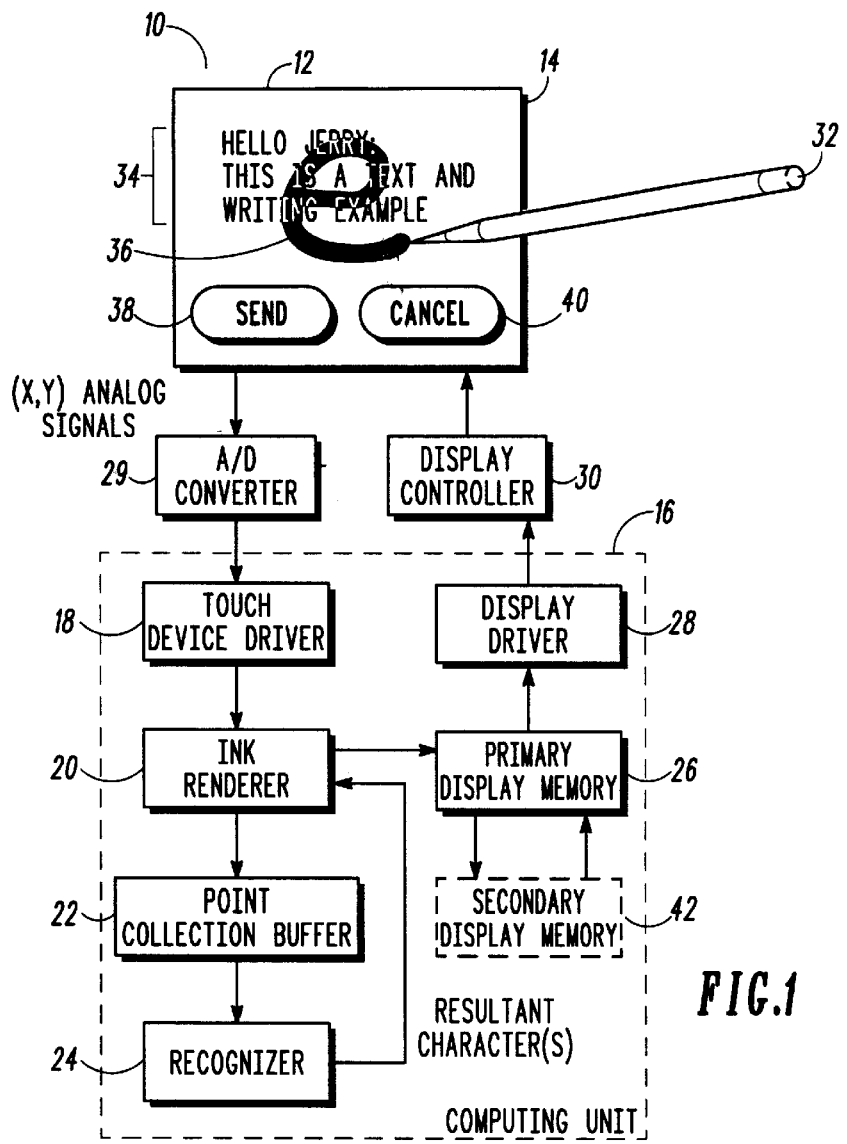
FIG. 1 illustrates a block diagram of a touch screen device according to the preferred embodiment of the present invention.

As illustrated in FIG. 1, the structure of the device 10 consists of a touch sensitive surface 12 and a display unit 14 (e.g., a liquid crystal display). The touch sensitive surface 12 is overlaid on top of the display unit 14 to create the device 10. Preferably, the touch sensitive surface 12 is a resistive grid, but could be an inductive grid, capacitance grid or any other touch sensitive surface known in the art.

The internal circuitry components of the device 10 comprise a touch device driver 18, an ink renderer 20, a point collection buffer 22, a recognizer 24 (handwriting and/or character), a primary display memory 26 and a display driver 28. These components of the device 10 are preferably embedded in or on a computing unit 16 (e.g., a personal computer, a hand-held device, a microprocessor, etc.).

Optionally, the device 10 may further comprise an analog-to-digital converter (hereinafter referred to as an "A/D converter") 29 and/or a display controller 30, typically as pieces of hardware. It should be noted that the A/D converter 29 can be replaced by any device or method that reports either Cartesian coordinates (hereinafter referred to as "points") or row and column indices, including but not limited to, light emitting diodes (LED) with LED receivers, light pens (which use scan line converter circuitry) and lasers.

A pointer 32 is used to write the rendering ink 36 on the touch sensitive surface 12. The pointer 32 is either a stylus, a finger, a pen or any other object that can be used to write the rendering ink 36 on the touch sensitive surface 12. Such pressure on the touch sensitive surface 12 is translated into points by the A/D converter 29.

As the rendering ink 36 is written on the touch sensitive surface 12, the touch device driver 18 reads from the A/D converter 29 each point that comprise the rendering ink 36. When a point is first received by the touch device driver 18 upon a pointer-down event (i.e., when the pointer first touches the touch sensitive surface 12), the touch device driver 18 must first determine if this pointer-down event represents an inking event or some other user interface event. Other user interface events are normally referred to as hot spot actions and correspond to a button or a key press event, a selection event, etc.

Hot spots 38, 40 are pre-defined screen regions (i.e., areas on the device 10 where a button, an icon or a key is displayed). A pointer-down event within the region assigned to the hot spot is interpreted as activating that hot spot. In the preferred embodiment of the present invention, it is assumed that all other touch screen dependent user interface events are restricted to hot spot activation events. For example, there are two hot spot areas 38, 40 which appear as buttons near the bottom of the device 10. Using the pointer 32 to touch the device 10 within the "Send" button area 38 causes the message currently being composed to be sent. In the same regard, touching the device 10 within the "Cancel" button area 40 causes the message currently being composed to be canceled.

Pointer-down events which fall outside of any hot spot region are interpreted as inking events. There is one important exception to the preceding rule: if a pointer-down event is interpreted as part of a continuous stroke event (as defined below), then that pointer-down event is treated as an inking event even if it falls within a hot spot region.

The touch device driver 18 passes each point to the ink renderer, and the ink renderer 20 formats the points to be displayed on the device 10. The ink renderer 20 renders new points as they are received. If the time interval between the new point and the previous point is on or below a first threshold (i.e., sufficiently small), and the absolute displacement in x and y pixels between these two points is on or below a second threshold (i.e., sufficiently small), the new point is assumed to represent a continuous extension of the previous point and is rendered as a continuous line joined to the previous point. This is referred to as a continuous stroke event.

Figure 2:
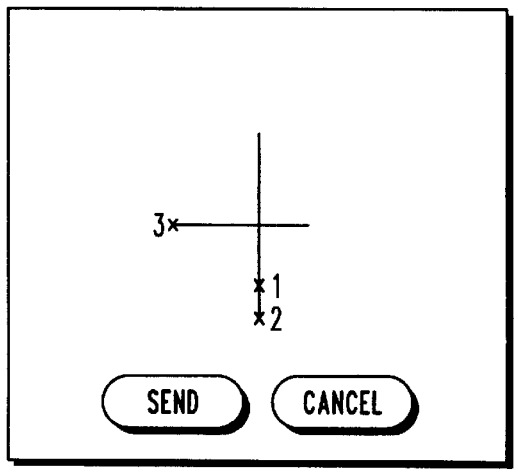
FIG. 2 illustrates a spatial relationship between ink points according to the preferred embodiment of the present invention.

If the time interval between inking events is above the first threshold, or the displacement in x or y pixels is above the second threshold, then the new point is rendered as an isolated point and is not joined to the previous point. For example, as shown in FIG. 2, points 1 and 2 are close enough in space and time to be rendered as part of a continuous stroke, while points 2 and 3 are too far apart in either space or time to be joined into a single stroke. As a result, point 3 is treated as the start of a second stroke.

The point collection buffer 22 collects points from the ink renderer 20 and buffers the points internally, by recording its corresponding value, until a character(s) is completely written.

The recognizer 24 retrieves the points from the point collection buffer 22 and compares single strokes and groups of strokes to a memory of pre-stored character templates. There are a large variety of recognizers 24 in the art (e.g., as described in U.S. Pat. No. 5,742,705 and incorporated herein by reference) and the present invention is adaptable to work with any type of recognizer 24, whether the recognizer 24 operates on single characters printed in isolation or on groups of characters written in a cursive or semi-cursive style. The recognizer 24 performs handwriting-and/or character recognition on the collection of points and passes character codes for the resultant character(s) to the ink renderer 20.

After the ink renderer 20 receives the character codes for the resultant character(s) from the recognizer, the ink renderer 20 draws each point on the device 10 by storing a value of one (1) in its corresponding memory location—the location that corresponds to a given point—in the primary display memory 26. Text characters 34 and rendering ink 36 shown on the device 10 require that certain pixels are turned on or off, thus the ink renderer 20 sets corresponding memory locations in the primary display memory 26 to specific values.

The primary display memory 26 stores values that determine what is shown on the GUI. Many simple display units 14 of the described art require only one bit of memory to represent each pixel on the display unit 14, also known as one-bit-per-pixel, which means that there are two possible states (e.g., colors) for a pixel: on or off. The primary display memory 26 passes these values to the display driver 28.

The display driver 28 maps the values received from the primary display memory 26 to the rows and columns of pixels in the display unit 14. Normally, recognized text characters 34 are queued for drawing at a rate that is significantly different from the rate for rendering ink 36.

The display controller 30 receives the map of values from the display driver 28 and updates (or refreshes) the display unit 14 accordingly. It is important to note that the display controller 30 can be replaced by any device that is capable of refreshing or triggering the refreshing of the display unit 14.

In the preferred embodiment of the present invention, which utilizes the simplest form of the display unit 14, each pixel only has two states: black and white. In this case, the text characters 34 and the rendering ink 36 are distinguished by using a different density of black pixels. The text characters 34 are displayed using the highest density allowed on the device 10, while the rendering ink 36 is shown by using a lower density (typically 50%) of black pixels. For example, every pixel in each horizontal row is on for the text characters 34. Every other pixel, however, is turned on for the rendering ink 36. It should be noted that a pixel is turned on if it is on either in a text character 34 or in the rendering ink 36. A simple ORing operation is used to combine the text characters 34 and the rendering ink 36 in this case.

One difficulty that is resolved by the present invention is that the text characters 34 and the rendering ink 36 must co-extensively be displayed on the GUI without one obscuring the other. This is accomplished in several ways, depending on the nature of the display unit 14.

Referring to FIG. 1, the overlapping portion of the text characters 34 and the rendering ink 36 are shown in a different state from the non-overlapping portions of the text characters and the rendering ink. A non-overlapping portion of the text characters 34 is presented on the display unit 14 in a first state, a non-overlapping portion of the rendering ink 36 is presented on the display in a second state, and an overlapping portion of the text characters and the rendering ink are presented on the display in a third state. For example, as shown in FIG. 1, the non-overlapping portion of the text characters 34 and the non-overlapping portion of the rendering ink 36 are presented in similar states, namely a dark color, and the overlapping portion of the text characters and the rendering ink are presented in a third state, namely a light color, different from the first and second states. Also, a common area for presenting the text characters 34 and the rendering ink 36 is presented in a background state similar to the third state but different from the first and second states.

Many display units 14 in use today are not restricted to only two states for each pixel, but support either several shades of gray or many different colors at each pixel. With display units 14 having multiple states for each pixel, text characters 34 and rendering ink 36 are both rendered at the full pixel density of the device 10, but using different shades or colors. For example, a dark color (e.g., black) can be used to display the text characters 34 and a light color (e.g., gray) can be used to display the rendering ink 36, or vice versa.

Alternatively, a combination of shades of gray and different density of pixels can be used to display either the text characters 34 or the rendering ink 36. For example, a relatively bold image or a first pixel density can be used to display the text characters 34 on the GUI and a relatively less-bold image or a second less dense pixel density can be used to display the rendering ink 36 on the GUI.

Another alternative is to display the rendering ink 36 in the same color and line-fill pattern as the text characters 34, but with the lines of the rendering ink 36 appearing distinctly thicker than those of the text characters 34 or vice versa. For example, as shown in FIG. 1, if the size of a pointer-nib (i.e., the pixel dimensions for drawing a single point on the display unit 14) were three-by-three for rendering ink 36 and one-by-one for text characters 34, the rendering ink 36 would appear more vivid than the text characters 34, and thereby would create the illusion that the rendering ink 36 appears above on top of) the text characters 34. Such an arrangement allows the text characters 34 to be visible co-extensively with the rendering ink 36. If a pixel is part of both a text character 34 and the rendering ink 36, the pixel appears in the shade, color or pixel density of the text character 34.

Moreover, if the device 10 is used with a monitor or the device 10 has a back light, the brightness can be adjusted to distinguish between the text characters 34 and the rendering ink 36. Flashing ink can also be used to distinguish between the text characters 34 and the rendering ink 36. Thus, presenting the text characters 34 and the rendering ink 36 in any of the above described forms allow the device 10 to co-extensively present the text characters 34 and the rendering ink 36 in a common area of the GUI.

A first alternative method for co-extensively presenting the text characters 34 and the rendering ink 36 in a common area of the GUI along with other GUI objects is referred to as double buffering. The structure and internal circuitry components, as described above, are essentially the same for the first alternative method, with the addition of a secondary display memory 42. It is important to note that the primary display memory 26 represents the memory mapped to all pixels of the display unit 14. The secondary display memory 42 is at least large enough to represent the pixels in the active inking area, and can be identical in size to the primary display memory 26.

Before rendering ink is drawn to represent a new character on the device 10, the values stored in the primary display memory 26 are copied into the secondary display memory 42. Rendering ink is then drawn freely anywhere in the active drawing area; ink can be drawn over text characters 34 and other GUI objects within the active drawing area.

In order to erase the rendering ink 36 that is handwritten on the touch sensitive surface 12 according to the first alternative method, the ink renderer 20 iterates through all the points stored in the point collection buffer 22 to determine the bounding rectangular coordinates ($X_{min}$, $Y_{min}$; $X_{max}$, $Y_{max}$) of the rendering ink 36. The ink renderer 20 uses these coordinates to determine beginning and ending addresses within the secondary display memory 42 (demarcating a range of memory that will be copied) and beginning and ending addresses within the primary display memory 26 (demarcating a range of memory that will be replaced). The ink renderer 20 copies the range of memory from the secondary display memory 42 into the primary display memory 26. Copying the defined range of memory from the secondary display memory 42 into the primary display memory 26 restores the primary display memory 26 to its original values, thereby erasing the rendering ink 36 and restoring the look of the GUI. The text characters 34 in the GUI are then updated to display any resultant character or characters recognized by the recognizer 24.

When system performance is an issue (e.g., utilizing a low power central processing unit), a second alternative method is used for co-extensively presenting the text characters 34 and the rendering ink 36 in a common area of the GUI along with other GUI objects. The structure and internal circuitry components, as described above, are essentially the same for the second alternative method. The second alternative method is accomplished by performing an exclusive-OR (X-OR) operation on all values in the primary display memory 26 that correspond to pixels in the rendering ink 36 for a character that is written.

Each pixel of the display unit 14 has a point location and a color value (e.g., 0 for white or 1 for black) associated therewith. The ink renderer 20 stores each point that it receives from the touch device driver 18 in the point collection buffer 22. The ink renderer 20 also draws each point on the device 10 by using the x and y coordinates of each point to calculate the address of a memory location in the primary display memory 26 to create a target memory location. The ink renderer 20 then performs an exclusive-OR operation between the current color value in the target memory location and 1 (a constant). It should be noted that the exclusive-OR gate itself is not-shown in FIG. 1 for simplicity. The result of the exclusive-OR operation is then stored in the same target memory location in the primary display memory 26. An exclusive-OR operation of this type can have one of the following outcomes: if 1 is currently stored in the target memory location, then 1 X-OR 1 equals 0, and 0 becomes the new value stored in that target memory location; otherwise, if 0 is currently stored in the target memory location, then 1 X-OR 0 equals 1, and 1 becomes the new value stored in the target memory location.

In order to erase the rendering ink in the second alternative method, the ink renderer 20 re-draws the same points in the point collection buffer 22 by using the same X-OR drawing operation for each point. Repeating the X-OR operation for each point effectively restores the effected memory locations to their original values, thereby erasing the rendering ink 36 and restoring the look of the GUI. The text characters 34 in the GUI are then updated to display any character or characters recognized by the recognizer 24.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for co-extensively presenting text characters and rendering ink on a display of an electronic device, the display including an input-sensitive surface, the method comprising the steps of:

presenting text characters in a first state on the display;

receiving rendering ink at the input-sensitive surface of the display; and presenting a non-overlapping portion of the text characters in a first state, a non-overlapping portion of the rendering ink in a second state, and an overlapping portion of the text characters and the rendering ink in a third state different from the first and second states.

2. The method of claim 1, wherein the second state is similar to the first state.

3. The method of claim 1, further comprising the step of presenting a common area for presenting the text characters and the rendering ink, the common area having a background state different from the first and second states.

4. The method of claim 3, wherein the background state is similar to the third state.

5. The method of claim 1, wherein the first, second and third states correspond to one of the following types of states: color, shade, density, thickness, brightness and effect.

6. The method of claim 1, wherein the first and second states are a first color and the third state is a second color different from the first color.

7. The method of claim 6, wherein the first color is a dark color and the second color is a light color.

8. A electronic device comprising:

a display capable of presenting co-extensively text characters and rendering ink;

an input-sensitive surface adjacent to the display to receive the rendering ink; and a computing unit coupled to the display and the input-sensitive surface, the computing unit being effective to command the display to present a non-overlapping portion of the text characters in a first state, a non-overlapping portion of the rendering ink in a second state, and an overlapping portion of the text characters and the rendering ink in a third state different from the first and second states.

9. The electronic device of claim 8, wherein the second state is similar to the first state.

10. The electronic device of claim 8, wherein the display includes a common area for presenting the text characters and the rendering ink, the common area having a background state different from the first and second states.

11. The electronic device of claim 10, wherein the background state is similar to the third state.

12. The electronic device of claim 8, wherein the first, second and third states correspond to one of the following types of states: color, shade, density, thickness, brightness and effect.

13. The electronic device of claim 8, wherein the first and second states are a first color and the third state is a second color different from the first color.

14. The electronic device of claim 13, wherein the first color is a dark color and the second color is a light color.

15. The electronic device of claim 8, wherein the input-sensitive surface receives input from a pointer.

* * * * *